(12) United States Patent
Ke

(10) Patent No.: US 8,436,740 B2
(45) Date of Patent: May 7, 2013

(54) ADAPTER AND PORTABLE ELECTRONIC DEVICE

(75) Inventor: Lian-Tien Ke, Taipei (TW)

(73) Assignee: ASUSTeK Computer, Inc., Taipei (TW)

( * ) Notice: Subject to any disclaimer, the term of this patent is extended or adjusted under 35 U.S.C. 154(b) by 529 days.

(21) Appl. No.: 12/720,213

(22) Filed: Mar. 9, 2010

(65) Prior Publication Data

US 2010/0231397 A1 Sep. 16, 2010

(30) Foreign Application Priority Data

Mar. 16, 2009 (TW) .............................. 98108457 A

(51) Int. Cl.
*G08B 21/00* (2006.01)

(52) U.S. Cl.
USPC ........................................................ 340/654

(58) Field of Classification Search .................. 340/654, 340/568.2, 571; 439/296, 363, 364
See application file for complete search history.

(56) References Cited

U.S. PATENT DOCUMENTS

| | | | |
|---|---|---|---|
| 5,336,099 A | | 8/1994 | Aldous et al. |
| 5,450,271 A | * | 9/1995 | Fukushima et al. ...... 361/679.43 |
| 5,773,332 A | * | 6/1998 | Glad ............................ 439/344 |
| 5,882,220 A | * | 3/1999 | Horii et al. .................... 439/297 |
| 6,605,924 B2 | * | 8/2003 | Tanaka et al. .................. 320/113 |
| 7,333,325 B2 | * | 2/2008 | DeLuga et al. .......... 361/679.55 |
| 7,808,779 B2 | * | 10/2010 | Lum et al. ................ 361/679.43 |
| 7,859,833 B2 | * | 12/2010 | Tanaka ..................... 361/679.41 |
| 2002/0021551 A1 | | 2/2002 | Kashiwagi |
| 2002/0145847 A1 | | 10/2002 | Crosby |
| 2008/0050963 A1 | | 2/2008 | Shi et al. |
| 2008/0212274 A1 | | 9/2008 | Song et al. |

FOREIGN PATENT DOCUMENTS

| | | |
|---|---|---|
| CN | 1458721 | 11/2003 |
| CN | 1893455 | 1/2007 |
| EP | 1327957 A1 | 7/2003 |
| JP | 05-027988 | 4/1993 |
| JP | 07-079566 | 3/1995 |
| JP | 9213435 A | 8/1997 |
| JP | 10302875 A | 11/1998 |
| JP | 2000175301 A | 6/2000 |
| JP | 2007122354 A | 5/2007 |
| TW | 429648 | 4/2001 |
| TW | M317714 | 8/2007 |
| TW | M338497 | 11/2007 |
| TW | 200906019 | 2/2009 |

* cited by examiner

*Primary Examiner* — Phung Nguyen
(74) *Attorney, Agent, or Firm* — Muncy, Geissler, Olds & Lowe, PLLC

(57) ABSTRACT

An adapter and a portable electronic device which may contain the adapter are disclosed. The adapter may be detachably contained in a containing recess of the portable electronic device, and it includes a base, a first connecting end and a second connecting end. The first connecting end is disposed on the base, and the second connecting end and the first connecting end are electrically connected to each other. In addition, a containing recess is formed on a surface of the portable electronic device for containing the adapter. The portable electronic device may remind the user to put away the adapter into the containing recess.

13 Claims, 8 Drawing Sheets

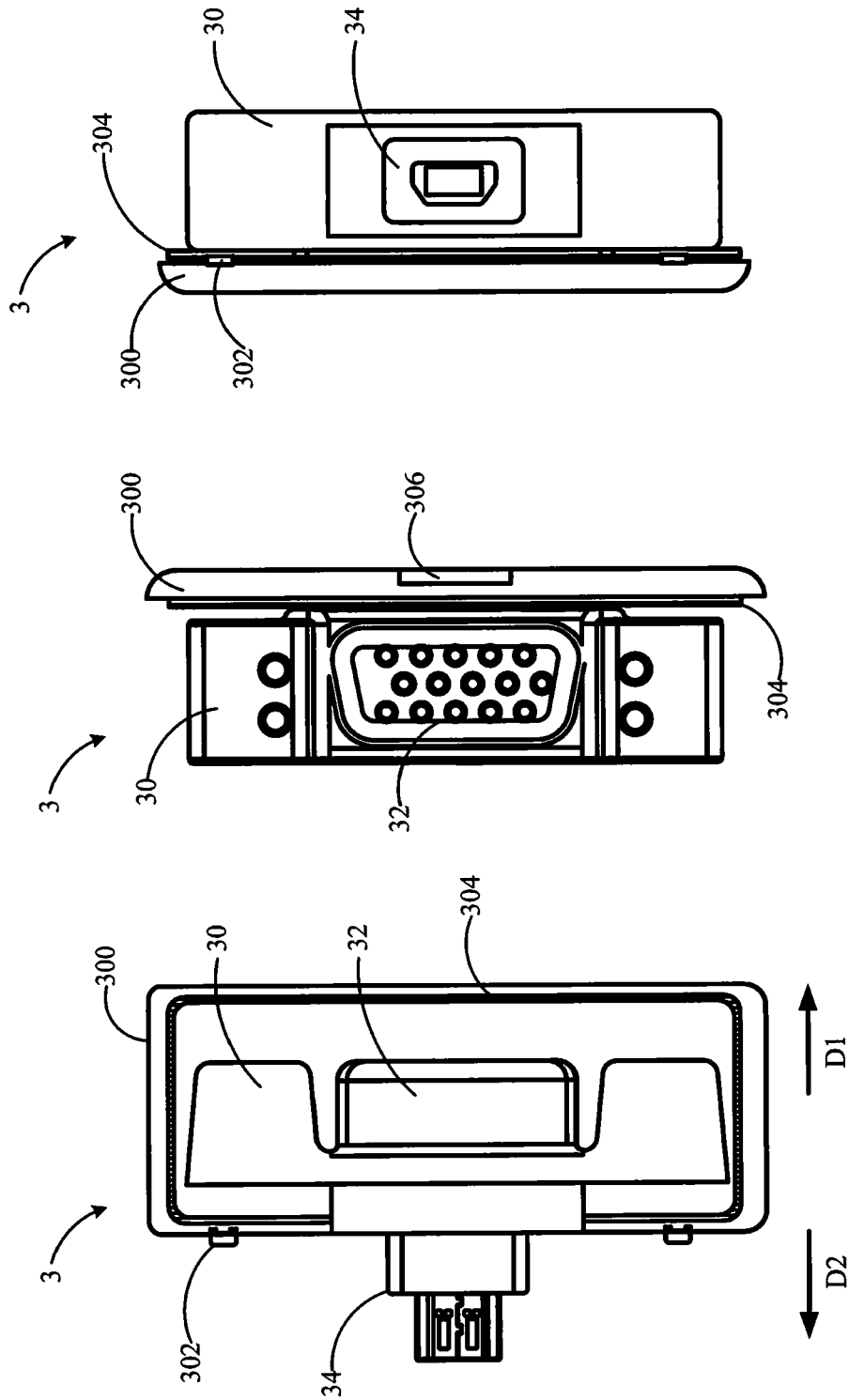

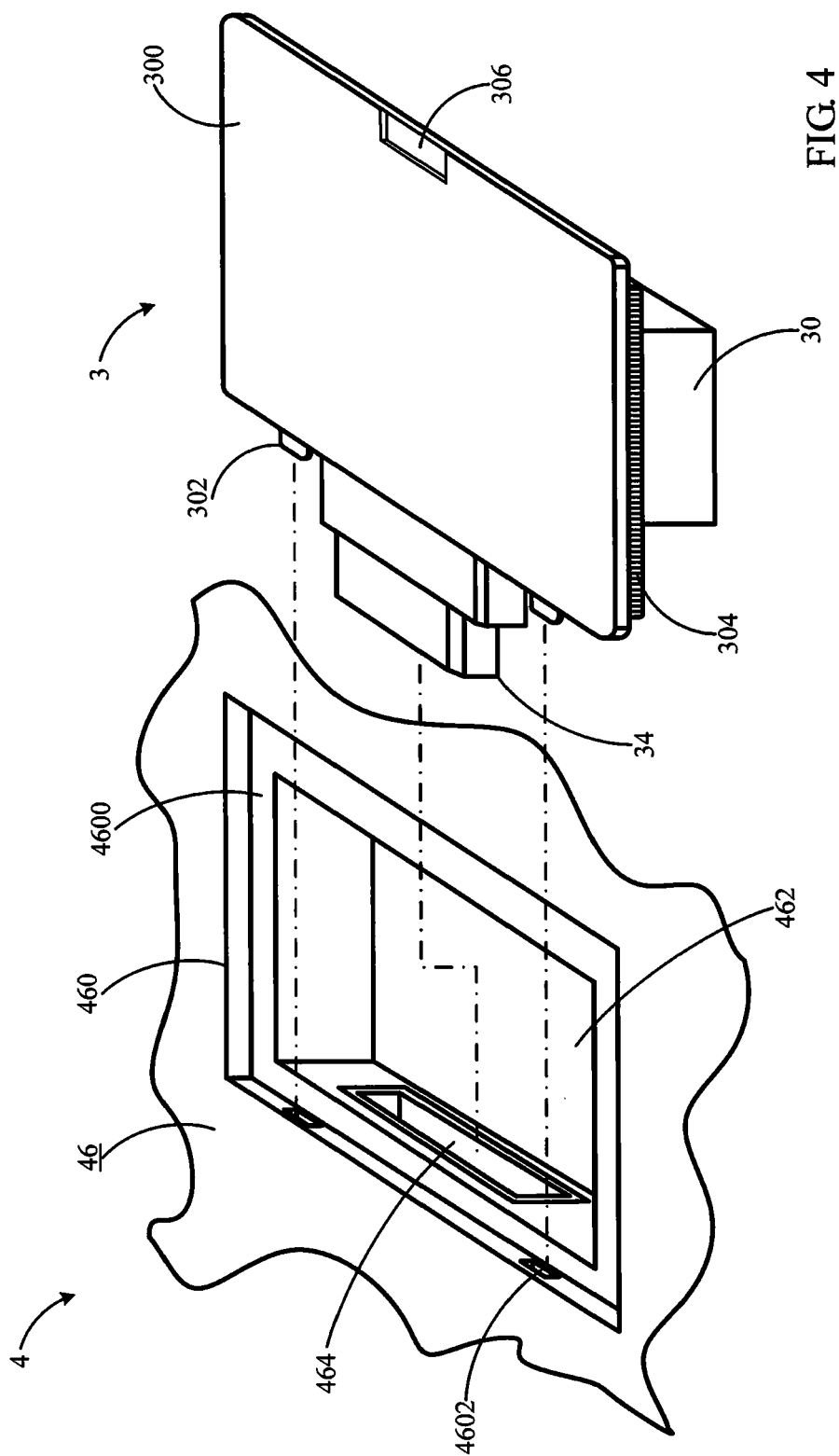

ADAPTER AND PORTABLE ELECTRONIC DEVICE

CROSS REFERENCE TO RELATED APPLICATIONS

This Non-provisional application claims priority under 35 U.S.C. §119(a) on Patent Application No(s). 098108457 filed in Taiwan, Republic of China on Mar. 16, 2009, the entire contents of which are hereby incorporated by reference.

BACKGROUND OF THE INVENTION

1. Field of Invention

The invention relates to an adapter and, more particularly, to an adapter detachably disposed in a portable electronic device.

2. Related Art

Electronic devices such as a notebook computer, a personal digital assistant (PDA), a multimedia player device and a mobile phone are all equipped with connecting ports. The connecting ports may be used to connect various peripheral devices such as a printer, a keyboard, a mouse, a universal serial bus (USB) flash drive, a network cable, a compact disk drive and so on. In the external connecting mode, the electronic device may have high expandability, and the number of devices disposed on the electronic device may be reduced, which increases the portability and convenience of the electronic device.

Since there are various kinds of peripheral devices, the types of connecting ports also are various. For example, the common types of connecting ports include network cable connecting ports, modem connecting ports, parallel ports, serial ports, USB ports, mouse and keyboard connecting ports (personal system/2 (PS/2) ports), video connecting ports, such as VGA ports, DVI ports, separate-video (S-video) connecting ports, retractable media connecting ports (for connecting external floppy disk drives or external compact disk drives), audio connecting ports, such as earphone connecting ports and microphone connecting ports, memory connecting ports and so on. The connecting ports listed above include sockets or holes for the plugs of the peripheral devices to insert. Thus, the electronic device may be electrically connected to the peripheral devices, and then the function of the electronic device is expanded.

To take a notebook computer as an example, the connecting ports are often disposed at the front, back, left and right sides of the main body. Recently, since a battery of the notebook computer is often disposed at the back, the disposing space of the connecting ports may be limited at the front, left and right sides. In addition, to increase the portability and convenience of the notebook computer, being light and slim becomes the main objective when the notebook computer is designed. However, as the notebook computer is slimmer and slimmer, some connecting ports with a larger size such as the VGA port, the PS/2 port and the serial port are hard to be disposed on the notebook computer.

Some notebook computer designers try to connect a peripheral device with a larger connecting port to the notebook computer via an adapter cable. Thus, the computer only may be equipped with a smaller sized connecting port such as the USB port, for users connect the connecting cable to the USB port to connect the peripheral device. In such a case, the notebook computer does not need to be equipped with larger connecting ports, and the thickness of the notebook computer would not increase.

However, since the adapter cable is not the necessary accessory, the user may forget to bring it, and thus he cannot connect the peripherals to the notebook computer and use the peripherals when the peripherals are needed. In addition, the user may forget to put away the cable, and the adapter cable may be lost.

SUMMARY OF THE INVENTION

The invention discloses an adapter and, more particularly, the adapter may be detachably contained in a containing recess of a portable electronic device.

According to an embodiment of the invention, the adapter in the invention includes a base, a first connecting end and a second connecting end. A lid is formed on the base. The first connecting end is disposed on the base, and the second connecting end and the first connecting end are electrically connected to each other. When the adapter is contained in the containing recess, the lid covers an opening of the containing recess.

Another aspect of the invention provides a portable electronic device which may contain the adapter.

According to an embodiment of the invention, the portable electronic device in the invention includes a containing recess, the adapter and an alarming module. The containing recess is formed at the surface of the portable electronic device for containing the adapter. When the portable electronic device is powered off, the alarming module generates an alarming message to remind the user to put away the adapter into the containing recess.

To sum up, the adapter in the invention is contained in the portable electronic device properly. In addition, when the user uses the adapter to connect the portable electronic device and peripheral devices, the portable electronic device in the invention reminds the user to put away the adapter into the containing recess, and thus the user cannot lose the adapter.

These and other features, aspects and advantages of the present invention will become better understood with regard to the following description, appended claims, and accompanying drawings.

BRIEF DESCRIPTION OF THE DRAWINGS

FIG. 3A to FIG. 3C are two-dimensional schematic diagrams showing the adapter in an embodiment of the invention; and FIG. 4 is a schematic diagram showing the adapter and the portable electronic device for containing the adapter according to an embodiment of the invention.

DETAILED DESCRIPTION OF THE INVENTION

The invention discloses an adapter contained in the portable electronic device, and it also discloses a portable electronic device which contains the adapter. The embodiments of the invention are illustrated hereinbelow.

Figure 1A:
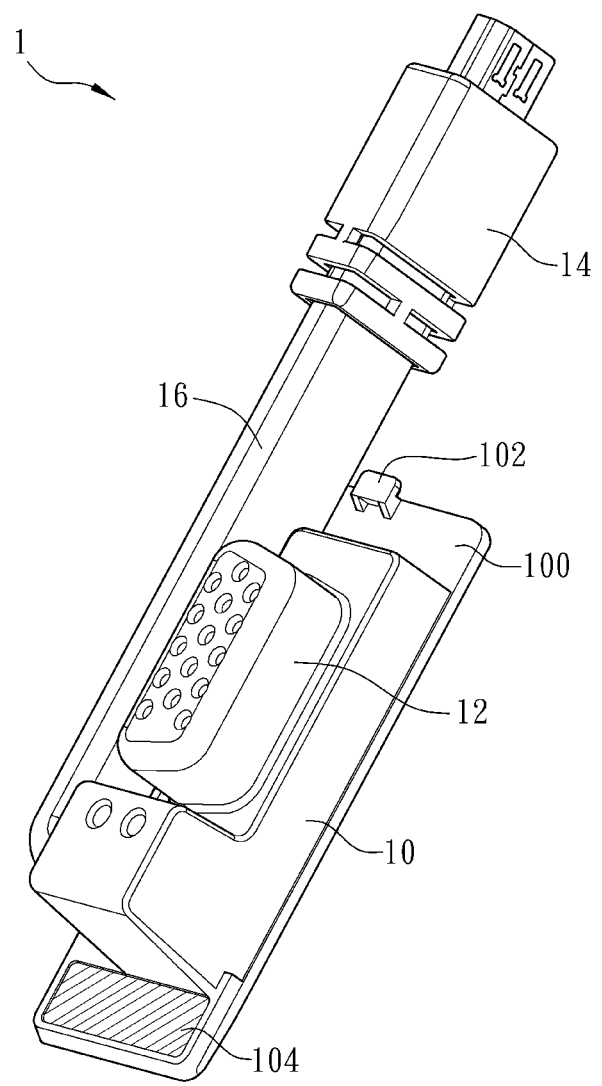
FIG. 1A and FIG. 1B are three-dimensional schematic diagrams showing the adapter in an embodiment of the invention.
Figure 1B:
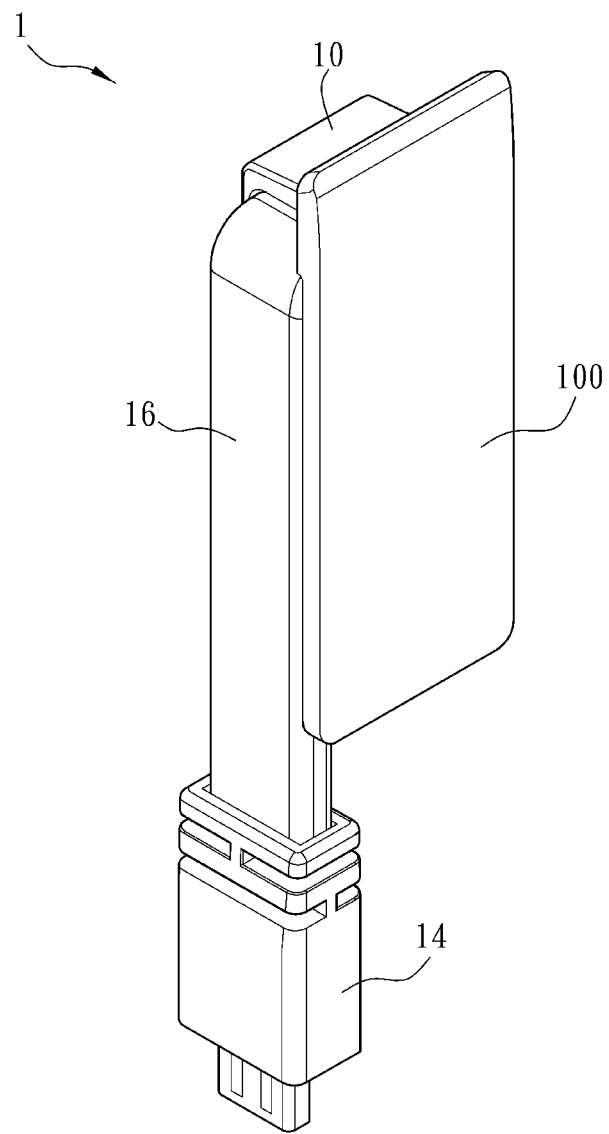
Figure 1C:
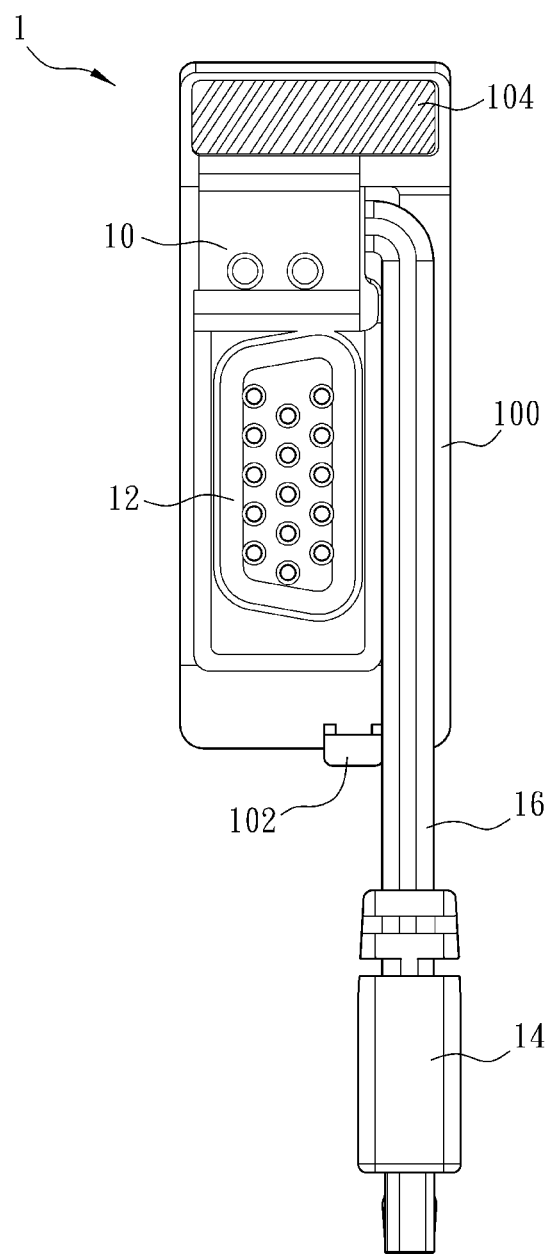
FIG. 1C to FIG. 1E are two-dimensional schematic diagrams showing the adapter in an embodiment of the invention.
Figure 1D:
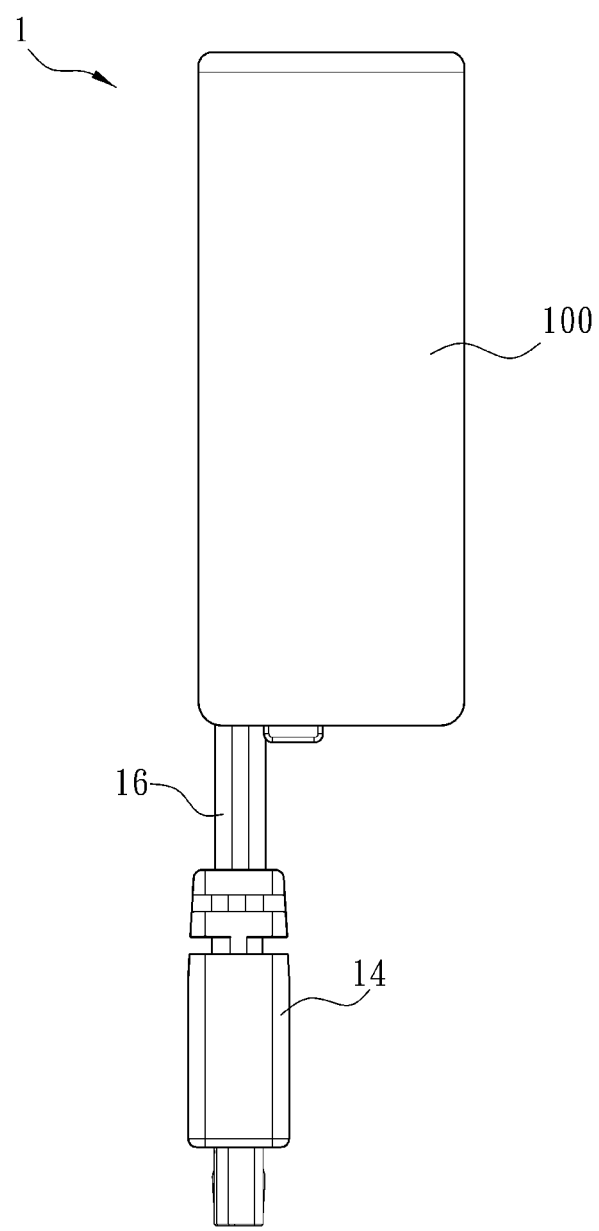
Figure 1E:
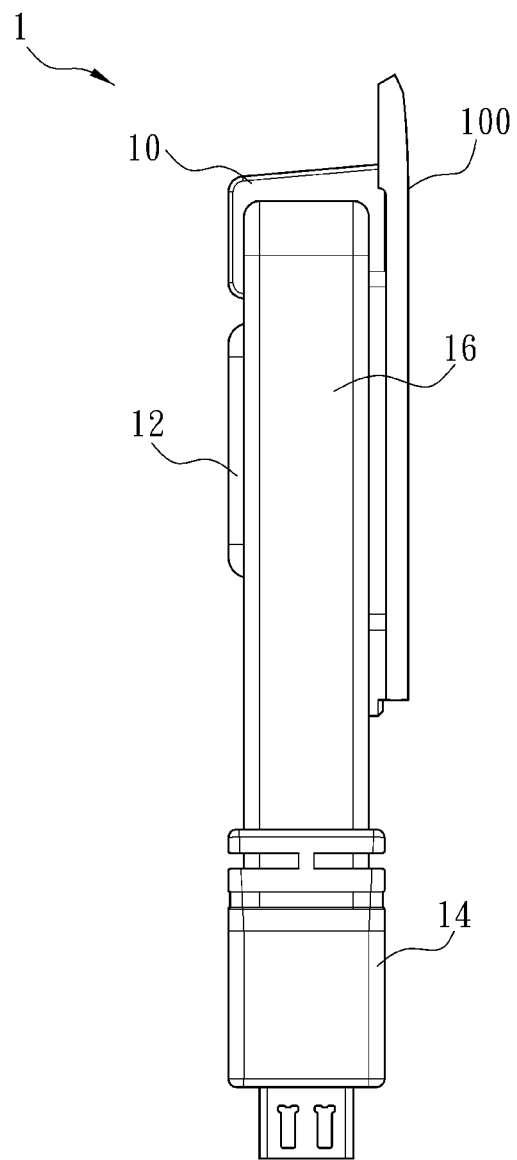

As shown in FIG. 1A to FIG. 1E, FIG. 1A and FIG. 1B are three-dimensional schematic diagrams showing an adapter in an embodiment of the invention. FIG. 1C to FIG. 1E are two-dimensional schematic diagrams showing the adapter in an embodiment of the invention.

As shown in FIG. 1, the adapter 1 in the invention includes a base 10, a first connecting end 12, a second connecting end 14 and a connecting cable 16. In addition, the base 10 also includes a lid 100. A protrusion 102 and a magnet 104 used as fixing portions are formed on the lid 100. The first connecting end 12 is disposed on the base 10, and the second connecting end 14 is connected to the first connecting end 12. In actual application, the base 10 and the lid 100 are integrally formed.

In actual application, the first connecting end 12 may be a video connector, such as a video graphics array (VGA) connector, a digital visual interface (DVI) connector or a high definition multimedia interface (HDMI) connector, a universal serial bus (USB) connector, a personal system/2 (PS/2) connector, a serial port connector, a S-video connector, an audio connector, or a memory card connector, and it is not limited thereto. In addition, the second connecting end 14 may be a USB connector, such as a mini-USB connector and a micro-USB connector, an institute of electrical and electronics engineers (IEEE) 1394 connector, an audio connector, and it is not limited thereto. In actual application, the volume of the first connecting end 12 is larger than that of the second connecting end 14.

In addition, the connecting cable 16 extends from the base 10, and it is connected to the first connecting end 12 and the second connecting end 14, respectively. In actual application, the connecting cable 16 may be rotated or bent freely to facilitate the usage of the user. In addition, the connecting cable 16 and the base 10 are connected via a rotating component (not shown) to allow the connecting cable 16 to rotate relative to the base 10 around the rotating component. In addition, in actual application, the length of the connecting cable 16 is adjusted according to different cases.

The invention also discloses a portable electronic device for containing the adapter. In actual application, the portable electronic device may be a notebook computer, a tablet computer, a PDA, a multi-media player device or an image capturing device, and it is not limited thereto. A notebook computer is taken as an example of the portable electronic device in the invention to illustrate the technique feature of the invention hereinbelow.

Figure 2:
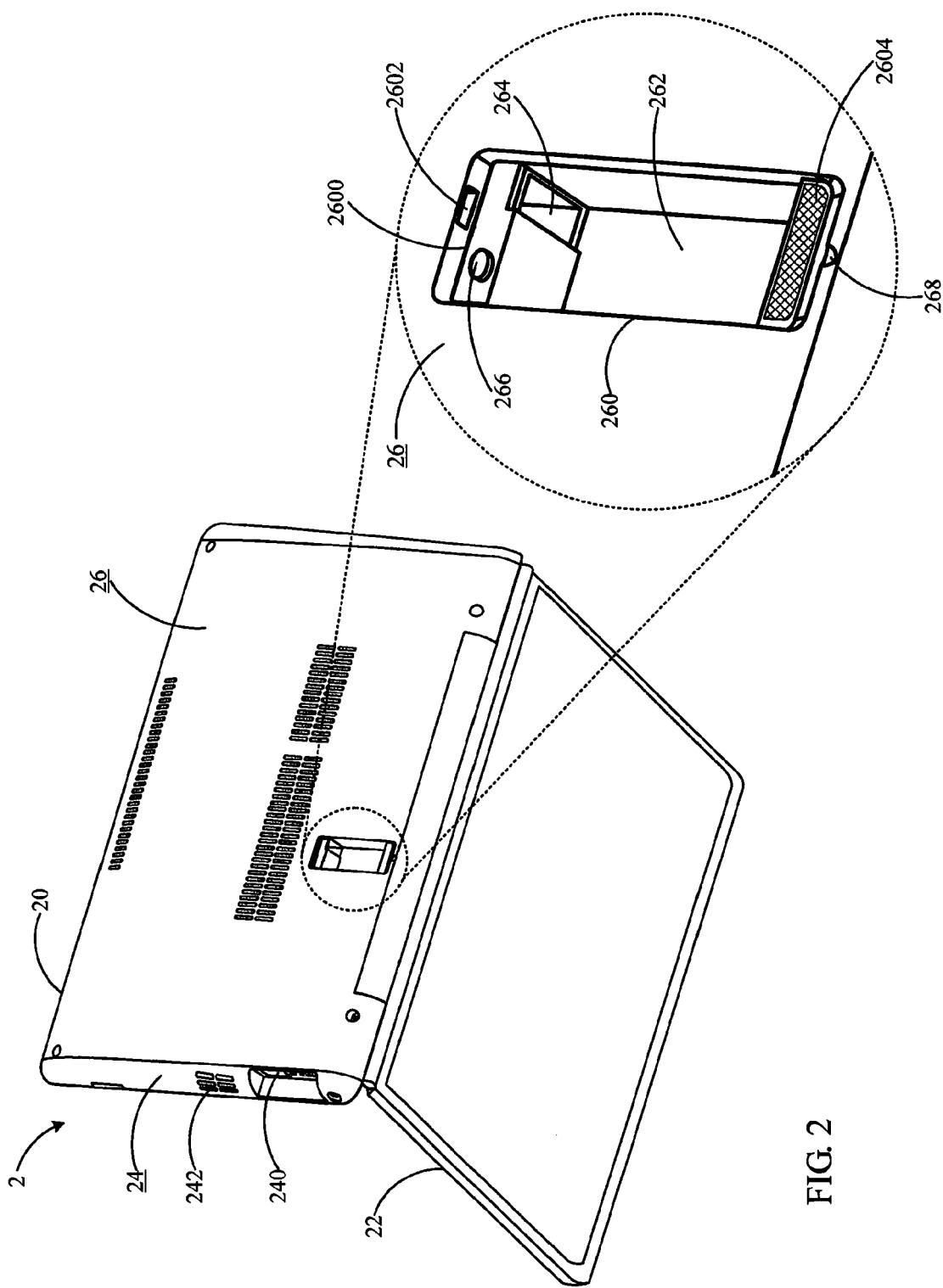
FIG. 2 is a three-dimensional schematic diagram showing the notebook computer in an embodiment of the invention.

FIG. 2 is a three-dimensional schematic diagram showing the notebook computer 2 in an embodiment of the invention. As shown in FIG. 2, the notebook computer 2 includes a body 20 and a screen 22. Furthermore, a side surface 24 and a bottom surface 26 are formed on the body 20. A connecting port 240 and a loudspeaker 242 are disposed on the side surface 24, and a containing recess 260 is formed on the bottom surface 26. The connecting port 240 is connected to the second connecting end 14 of the adapter 1. In addition, the containing recess 260 in FIG. 2 contains the adapter in FIG. 1A to FIG. 1E.

As shown in FIG. 2, the containing recess 260 includes a main containing space 262 and an extending containing space 264 communicating with each other. The main containing space 262 contains the base 10 and the first connecting end 12 of the adapter 1, and the extending containing space 264 contains the connecting cable 16 and the second connecting end 14. When the user contains the adapter 1, the connecting cable 16 and the second connecting end 14 are put into the extending containing space 264 from the joint of the main containing space 262 and the extending containing space 264. Then the base 10 and the first connecting end 12 are put into the main containing space 262.

In addition, a recessed hole 2602 is formed at the side area 2600 of the containing recess 260. When the base 10 and the first connecting end 12 of the adapter 1 are put into the main containing space 262 obliquely, the protrusion 102 on the lid 100 is inserted in the recessed hole 2602. When the user put the base 10 and the first connecting end 12 of the adapter 1 to the main containing space 262 totally, the lid 100 and the bottom surface 26 are located at the same plane, and the protrusion 102 and the recessed hole 2602 are fastened with each other. Thus, the adapter 1 is combined with the containing recess 260 and contained in the containing recess 260 firmly.

Furthermore, a metal sheet 2604 is further disposed at the side area 2600 of the containing recess 260. When the base 10 and the first connecting end 12 of the adapter 1 are contained in the main containing space 262, and the magnet 104 on the lid 100 and the metal sheet 2604 attract each other, the adapter 1 is combined with the containing recess 260 and contained in the containing recess 260 firmly. In actual application, the positions of the magnet 104 and the metal sheet 2604 are exchanged, and the magnet 104 and the metal sheet 2604 are replaced by other magnetic conducting elements which attract each other.

When the adapter 1 is contained in the containing recess 260, the protrusion 102 on the lid 100 is fastened with the recessed hole 2602, and the magnet 104 and the metal sheet 2604 attract each other to make the adapter 1 contained in the containing recess 260 firmly. The lid 100 covers the containing recess 260 and closely contacts the side area 2600 of the containing recess 260 to make the lid 100 aligned with the bottom surface 26 of the notebook computer 2 to form a plane. In addition, an indentation 268 is formed on the bottom surface 26 next to the containing recess 260 to allow the user to apply a force to take out the adapter 1 from the containing recess 260 easily.

In addition, the notebook computer 2 in the embodiment also has the function of reminding the user to put the adapter 1 into the containing recess 260. As shown in FIG. 2, a button 266 is disposed on the side area 2600 of the containing recess 260 in the notebook computer 2 in the embodiment. When the user make the adapter 1 contained in the containing recess 260, the lid 100 of the adapter 1 abuts against the button 266 closely, and when the user takes the adapter 1 out of the containing recess 260, the button 266 is released.

In actual application, when the button 266 is released, the notebook computer 2 starts a monitoring procedure. When the button 266 is pressed, the notebook computer finishes the monitoring procedure. Thus, the notebook computer 2 is designed to have an alarming mechanism as follows. When the user takes the adapter 1 out of the containing recess 260, the button 266 is released, and the notebook computer 2 starts the monitoring procedure. When the user powers off the computer without putting the adapter 1 back to the containing recess 260, the monitoring procedure is not finished. Thus the notebook computer generates a sound via the loudspeaker 242 to remind the user to contain the adapter 1.

In actual application, the notebook computer 2 in the invention is designed to have the alarming mechanism as follows. When the user powers off the notebook computer 2, the notebook computer 2 reminds the user to contain the adapter 1 in the containing recess 260.

The notebook computer 2 in the invention is also designed to have the alarming mechanism as follows. When the connecting port 240 is connected to the second connecting end 14, and the user powers off the notebook computer 2, the notebook computer 2 reminds the user to contain the adapter 1.

The above mechanisms may be executed by the basic input/output system (BIOS), and it also may be executed by the operating system of the portable electronic device or related software installed in the operating system. In actual application, the alarming mechanism of the portable electronic device also may be other mechanisms, and it is not limited to be the examples. In addition, in actual application, besides the loudspeaker 242, the portable electronic device in the invention also include others types of alarming modules such as a light emitting module to remind the user to contain the adapter.

FIG. 3A to FIG. 3C are two-dimensional schematic diagrams showing the adapter 3 in another embodiment of the invention. As shown in FIG. 3A to FIG. 3C, the adapter 3 in the embodiment also includes a base 30, a first connecting end 32 and a second connecting end 34. The difference between the adapter 3 and the adapter 1 in the above is that the second connecting end 34 of the adapter 3 is directly disposed on the base 30, and an additional connecting cable is not needed. Thus, the volume of the adapter 3 is reduced.

In actual application, the angle between a first connecting direction D1 of the first connecting end 32 and a second connecting direction D2 of the second connecting end 34 is adjusted according to different cases. For example, the angle between the first connecting direction D1 and the second connecting direction D2 in FIG. 3A is about 180 degrees. In actual application, the angle between the first connecting direction D1 and the second connecting direction D2 is between 90 degrees to 180 degrees, and it is not limited thereto.

In addition, as shown in FIG. 3A, the base 10 of the adapter 3 in the embodiment also includes a lid 300. The lid 300 includes the protrusion 302, the rubber edge strip 304 and the indentation 306.

FIG. 4 is a schematic diagram showing an adapter 3 and the portable electronic device 4 for containing the adapter 3 in an embodiment of the invention. In FIG. 4, a containing recess 460 is formed at a surface 40 of the portable electronic device 4. In addition, the containing recess 460 also includes a main containing space 462 and an extending containing space 464 communicating with each other. In addition, a recessed hole 4602 is also formed on the side area 4600 of the containing recess 460.

When the adapter 3 is contained in the containing recess 460, the user puts the second connecting end 34 into the extending containing space 464 from the joint of the main containing space 462 and the extending containing space 464, and then puts the base 30 and the first connecting end 32 into the main containing space 462.

When the base 30 and the first connecting end 32 of the adapter 3 are put into the main containing space 462 obliquely, the protrusion 302 of the lid 300 is inserted in the recessed hole 4602. When the base 30 and the first connecting end 32 of the adapter 3 are totally contained in the main containing space 462 to make the lid 300 located at the same plane with the bottom surface 46, the protrusion 302 is fastened with the recessed hole 4602. Thus, the adapter 3 is contained in the containing recess 460 firmly.

In actual application, the containing recess of the portable electronic device in the invention includes a through hole on the side wall to allow the second connecting end of the adapter to pass through. Thus, the base and the first connecting end of the adapter are contained in the containing recess. In other words, the extending containing space above may be replaced by the through hole.

In addition, when the adapter 3 is contained in the containing recess 460, the rubber edge strip 304 is combined with the side area 4600 tightly to prevent dust, water vapor and so on from entering the containing recess 460. The indentation 306 on the lid 300 is also used to allow the user to apply a force to take out the adapter 3 from the containing recess 460 easily.

In an embodiment of the invention, the portable electronic device 4 also reminds the user to contain the adapter 3 in the containing recess 460. The related alarming mechanism is the same with the above, and it is not illustrated herein for a concise purpose.

Compared with the conventional technology, the adapter in the invention is contained in the portable electronic device properly. Furthermore, when the user uses the adapter to connect the portable electronic device in the invention and the peripherals, the portable electronic device reminds the user to contain the adapter in the containing recess, which may prevent the user from losing the adapter.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An adapter suitable to detachably contained in a containing recess of a portable electronic device, the adapter comprising:
    a base having a lid;
    a first connecting end disposed on the base; and
    a second connecting end electrically connected to the first connecting end;
    wherein when the adapter is contained in the containing recess, the lid covers an opening of the containing recess,
    wherein the lid and a bottom surface of the portable electronic device form a plane while the lid covers the containing recess.

2. The adapter according to claim 1, wherein a fixing portion is formed on the lid.

3. The adapter according to claim 2, wherein the fixing portion is a protrusion, a recessed hole is formed on the containing recess, and when the protrusion and the recessed hole are fastened to each other, the adapter is combined with the containing recess.

4. The adapter according to claim 2, wherein a first magnetic conducting element disposes on the containing recess, and a second magnetic conducting element disposes on the fixing portion, when the first magnetic conducting element and the second magnetic conducting element attract each other, the adapter is combined with the containing recess.

5. The adapter according to claim 1, wherein the lid comprises a rubber edge strip disposed at a surface of the lid which contacts the containing recess.

6. The adapter according to claim 1, wherein the second connecting end is disposed on the base.

7. The adapter according to claim 1, further comprising a connecting cable extending from the base and connected to the first connecting end and the second connecting end, respectively.

8. The adapter according to claim 7, wherein the containing recess of the portable electronic device comprises a main containing space and an extending containing space communicating with each other, the main containing space is used to contain the base and the first connecting end, and the extending containing space is used to contain the connecting cable and the second connecting end.

9. The adapter according to claim 1, wherein the first connecting end is selected from the group consisting of a video connector, a universal serial bus (USB) connector, a personal system/2 (PS/2) connector, a serial connector, a separate video (S-video) connector, an audio connector and a memory card connector.

10. A portable electronic device comprising:
a containing recess formed at a surface of the portable electronic device;
an adapter detachably contained in the containing recess, wherein the adapter includes:
a base having a lid;
a first connecting end disposed on the base; and
a second connecting end electrically connected to the first connecting end;
wherein when the adapter is contained in the containing recess, the lid covers an opening of the containing recess; and
an alarming module generating an alarming message when the portable electronic device is powered off.

11. The portable electronic device according to claim 10, wherein a button is disposed in the containing recess, when the adapter is taken out of the containing recess, the button is released and the portable electronic device is triggered to perform a monitoring procedure, and when the adapter is contained in the containing recess, the adapter abuts against the button to stop the monitoring procedure.

12. The portable electronic device according to claim 10, wherein the alarming module is a light emitting module or a sound module.

13. The portable electronic device according to claim 10, wherein the containing recess comprises a main containing space and an extending containing space communicating with each other, the main containing space is used to contain the base and the first connecting end, and the extending containing space is used to contain the second connecting end.

* * * * *